Nov. 24, 1953 A. H. WEBSTER 2,660,512
METHOD AND APPARATUS FOR CONTROLLING THE
LIQUID SEALS ON STEAM STERILIZERS
Filed Jan. 14, 1949 2 Sheets-Sheet 1
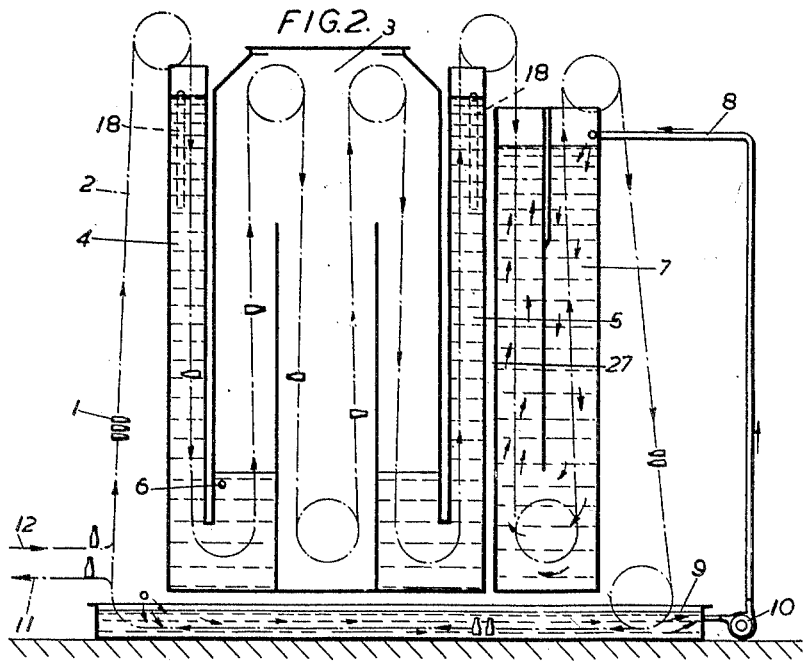
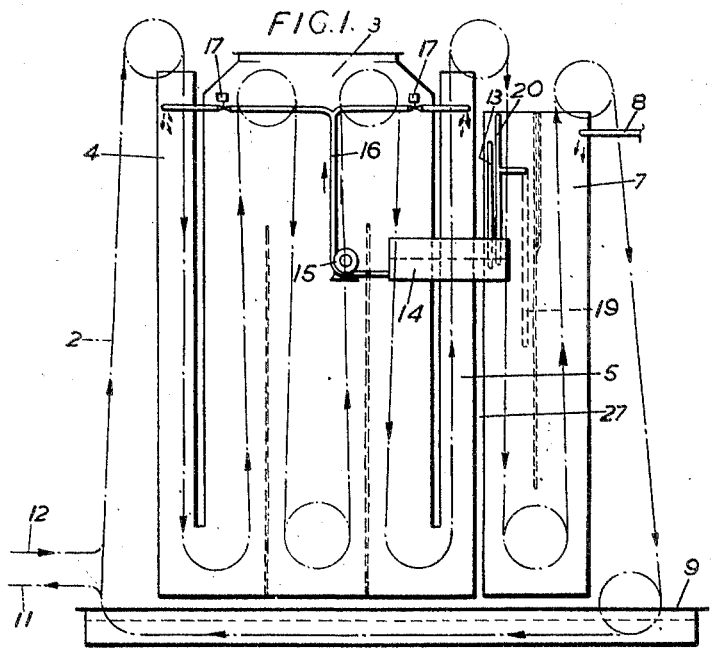
Inventor
ALEXANDER H. WEBSTER
By
Young, Emery & Thompson
Attorneys Nov. 24, 1953 A. H. WEBSTER 2,660,512
METHOD AND APPARATUS FOR CONTROLLING THE
LIQUID SEALS ON STEAM STERILIZERS
Filed Jan. 14, 1949 2 Sheets-Sheet 2

Inventor
ALEXANDER H. WEBSTER
By
Young, Emery & Thompson
Attorneys

Patented Nov. 24, 1953

2,660,512

UNITED STATES PATENT OFFICE 2,660,512

METHOD AND APPARATUS FOR CONTROLLING THE LIQUID SEALS ON STEAM STERILIZERS

Alexander Hyde Webster, London, England, assignor to R. W. Webster and Company Limited, Abbey Ironworks, Waltham Cross, England, a British corporation Application January 14, 1949, Serial No. 70,987

Claims priority, application Great Britain February 6, 1948

5 Claims. (Cl. 21—56)

This invention relates to sterilising machines such as used for sterilising milk or other liquids or foodstuffs in bottles or other containers.

The object of the invention is to devise a sterilising machine which will be more stable as regards its operating conditions than machines heretofore used, thus improving and rendering more uniform the quality of the finished product, reducing breakage of the containers due to temperature and other changes, and rendering the machine more flexible, and of greater utility than heretofore. The various features of the invention set out herein may advantageously be embodied in machines adapted to operate at the same temperature as known machines, i. e. at about 224° F., and moreover have further advantageous application to machines designed to operate at higher temperatures, e. g. at 230° F., as adapted for some purposes in accordance with modern practice.

The invention accordingly consists in a method of stabilising the operation of a sterilising machine having a sterilising chamber sealed by a head of liquid, wherein a part of the sealing column is subjected to positive cooling.

The invention further consists in a sterilising machine comprising a closed sterilising chamber sealed by a head of liquid, and means for positively cooling a length of the sealing column of liquid.

Figure 4:
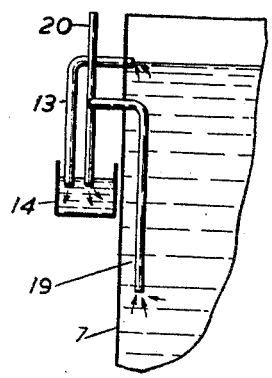
Figure 3:
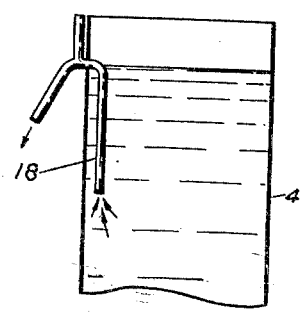
Figure 5:
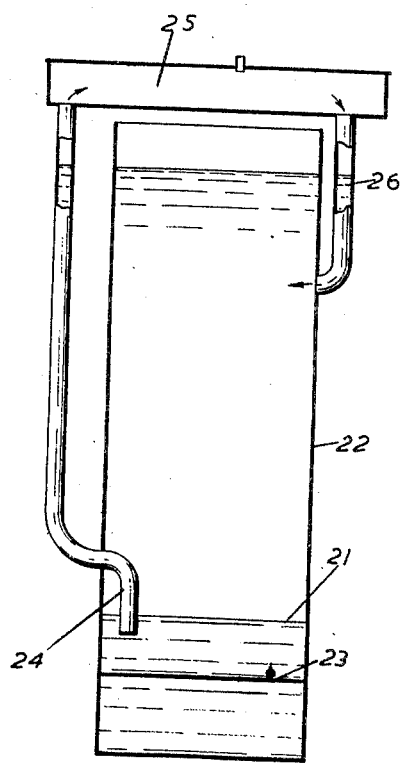

The invention will be clearly understood from the following description of forms (given, however, merely by way of example) which it may assume, and this description will be more readily followed by reference to the accompanying drawings, wherein:

Figure 1 is an end elevational view, and Figure 2 an end sectional elevation of a sterilising machine according to the invention, while Figures 3, 4 and 5 are sectional views of details of the invention.

The general construction of known sterilising machines, for example British Patent No. 377,890, to which the present invention is directed will be appreciated by reference to Figure 2 of the accompanying drawings, representing a bottle sterilising machine used, for example, to sterilise milk. Bottles 1 previously charged with the material to be sterilised are carried on an endless band 2 through a sectional chamber 3 filled with steam, maintained at a temperature of approximately 224° F., the passage of each bottle through the heated chamber occupying some 30-40 minutes. The inlet and outlet of the heated chamber comprises U-shaped passages 4, 5, filled with water whereby the chamber is sealed from the atmosphere, and a difference of water level in the two limbs of each U-shaped passage as shown provides a pressure head for maintaining the pressure inside the heated chamber necessary to keep the steam therein at the desired temperature of approximately 224° F. The bottles are passed through the water in the two sealing ducts, 4, 5, when entering and leaving the heated chamber 3, and the water in the inner or pressure side of the inlet sealing duct 4 is heated to the desired temperature by a steam coil, or by direct injection of steam at inlet 6 or otherwise, whereby the pressure tank becomes filled with wet steam at the desired pressure and temperature. The heating is thermostatically controlled to maintain the pressure and temperature at their desired values, and means are also provided automatically to maintain the desired head of water in the inlet and outlet sealing tanks in the event of variation of displacement of water therein arising, for example, from interruption of the transit of bottles into the machine on the carrier. It will be appreciated that although the inner limbs of one or both U-shaped sealing tanks are heated, the external limbs, on account of access of the atmosphere are at a substantially lower temperature and the temperature gradient is established in each sealing tank 4, 5. In particular the outgoing bottles enter the outlet sealing tank at the sterilising temperature and in passing through this tank transfer their heat to the water therein, maintaining the temperature gradient therein at prearranged values, without need for application of heat thereto from any external source.

After passing out of the outlet sealing tank 5 the bottles are carried through a cooling tank 7 sectioned to form a U-shaped conduit, and during this stage of transit the bottles are cooled by a flow of water introduced by a pipe 8 into the outlet side of the cooling tank 7 and flowing in the direction indicated by the arrows to an overflow or outlet aperture in the wall of the inlet side of tank 7. After this cooling the bottles may again be carried through a cooling trench 9 located beneath the machine, where they again move against an inflow of cooling water introduced by a pipe 10 to the trough 9. The water introduced into the cooling tank 7 may be drawn from the trough 9 and lifted in pipe 8 by means of a suitable pump 10a. After traversing the trough 9 the bottles are removed from the conveyor at the outfeed 11 located, for example, near to the infeed 12.

It will be apparent that the temperature maintained within the tank 3 is determined by the head of water maintained in the sealing ducts 4, 5. The water in these ducts is subject to variations of temperature, and consequential variations of density, by changes of external conditions, alterations of the rate of infeed of bottles and other causes, and there is considerable danger that the sealing columns in tanks 4 and 5 will become unstable, the balance thus be disturbed, and the desired head thus not maintained. This danger is present at whatever working temperature the machine is operated (e. g. at the temperature of 224° F. heretofore used), and may become increasingly difficult to control if the machine is to operate at a higher temperature, say 230° F. In particular water at high temperature in the inner or pressure limbs of the inlet and outlet seals may flow to the opposite limb of the seal where it may rise rapidly, through the cooler and denser water therein, and, upon reaching a zone of reduced pressure, tend to convert instantaneously to steam, thereby completely disturbing the balance of the seal.

This danger is to some extent, but not fully, controlled in the inlet seal by the fact that the water in the pressure limb is artificially heated under thermostat control which reduces the heating if abnormal conditions, resulting in undue rise of temperature, are set up. The water in the pressure limb of the outlet seal is heated by the continuous immersion of hot bottles from the holding chamber 3. It is not readily possible to reduce or control the temperature of this limb if rising temperature conditions prevail and in existing machines no means are provided for that purpose.

According to the present invention the aforesaid danger of instability in a sterilising machine is eliminated from, or controlled in, either or both the inlet and outlet seals of the machine by providing means for cooling a part of the liquid column contained in the outer limb of the seal. This cooling is controlled, preferably automatically, so as not only to maintain the average temperatures, and the temperature gradient of the column at any desired values, but also to provide a blanket of cooled or cooler water at the top of the column which will serve to stabilise the column, and will have the additional advantage, in the inlet seal, of acting as a tempering zone for initially receiving the incoming bottles thus avoiding or reducing breakage which might otherwise occur upon immersing the bottles in water at comparatively high temperature.

The cooling may be effected by any convenient means including, separately or in combination, air cooling of the exterior surfaces of the sealing tank over a selected area by natural convection and/or by an artificial draught from fans or the like: the direct injection of cooler water into the sealing column, or the passage of water or other convenient cooling media through coiled pipes immersed in the column.

In a preferred embodiment of the invention shown in Figure 1 of the drawings herewith, cooling is effected by the direct injection of water into the top of the water column in the inlet and outlet seals, allowing it to flow downwards through the sealing columns for a prearranged distance and to flow out from the sealing tanks through suitable outlets provided. While this cool injected water may be obtained from any convenient source, it is preferred according to the invention to take it as shown from the overflow of the bottle-cooling tank and to convey it by suitable piping to the top of the water column of the inlet and outlet seals.

As shown in Figures 1 and 4 water from the cooling tank 7 is conveyed by an overflow pipe 13 to an overflow tank 14 from which it is withdrawn and raised to a level at or above the top level of the water in the outer limbs of the sealing tanks by a pump 15 through a pipe 16 communicating by a T-junction with each of the sealing columns. The cold water thus introduced sinks into and cools the upper portion of each sealing column. A pipe 18 (Figures 2 and 3) secured in the wall of each sealing tank 4, 5, and open at its uppermost point, projects downwards in each sealing column and serves at its lower end as an overflow outlet for excess water in the column. It will be seen therefore that the sealing column is cooled between its uppermost level and the lower, open, end of overflow pipe 18, which may extend, as shown, to nearly one third of the depth of the column.

According to a further feature of the invention cooler water may be tapped from the cooling tank (in addition to water taken from the normal overflow outlet 13) at a point somewhat lower than the overflow outlet 13, i. e. reached by the cooling water at an earlier period of its flow through the cooling tank.

For this purpose a pipe 19 passing through the wall of the cooling tank 7 may project downwards to a comparatively low level in the cooling tank (Figures 1 and 4), and externally of the tank may be joined to a pipe 20, open at its upper end, which feeds into the overflow tank 14. It will be clear that the water tapped by means of pipes 19, 20, will be cooler than that passing through the overflow pipe 13, and the two supplies intermix in the overflow tank 14 to provide water at an intermediate temperature determined by the relative rates of flow of the two supplies. Suitable control valves (not shown) may be provided at the two outlets through which cooling water is taken from the cooling tank so that by suitable adjustment the relative amounts of water taken from the two points can be varied to modify the temperature of the mixture fed to the sealing column, according to working requirements. The total rate of flow of cooling water to the inlet seal is preferably controlled by thermostats 17 provided in order to maintain the thermal balance of the machine as dictated by the load imposed on the machine determined by the rate of input of bottles.

As in known sterilising machines, a machine according to the invention, as described above, may be provided with a safety device designed to limit the internal pressure of the machine to below a prearranged maximum value. One form of such a safety device is described in British patent specification No. 431,944. In the present invention it may take the form of a U-shaped tank communicating with the pressure chamber of the machine and providing an alternative water seal having a pressure head adapted to "break" before the sealing depth in the pressure limb of the main sealing tank is forced to zero. This safety tank is preferably well spaced from the heated water columns and other heated elements of the machine in order that it will not be subject to variations of temperature liable to render it unstable or to disturb the limiting safety conditions for which it is set.

One form which such a safety tank may assume is shown in Figure 5. The level 21 of water in one limb of this tank 22 is subjected to the steam pressure in the holding chamber 3 of the machine, and represents the lower working level of water in the pressure limbs of the sealing tanks 4 and 5. The level 23 represents the lowest point of the partitions in the sealing tanks 4 and 5, and is below the open end of a pipe 24 which is normally immersed in the water on the pressure side of tank 22. This pipe 24 communicates with an overhead venting tank 25 from which another pipe 26 communicates with the sealing limb of safety tank 22. It will be clear that if pressure in the machine increases unduly the water level 21 in tank 22 will be depressed but will open the lower end of pipe 24 before it reaches the seal-breaking level 23 of the partitions in tanks 4 and 5. When pipe 24 is thus opened steam enters it, forcing water into the venting tank 25 from which it is returned to the sealing column. This escape of steam reduces the internal pressure of the machine to a safe condition and the seal is restored.

If desired the gap 27 between the sealing tank 5 and the cooling tank 7 (Figure 2) may be closed at its sides to form a tunnel through which air, by convection and/or by fan pressure, may pass to assist in cooling the adjacent walls of the tanks.

If any of the forms of the invention described above are used to sterilise articles which are normally at a low temperature when fed into the machine, the articles, e. g. glass bottles, may become damaged by sudden substantial rise of temperature when entering the inlet seal, despite the fact that the upper portion of the sealing column is cooled. To overcome this difficulty there may be provided a pre-heating chamber or column through which the articles are passed immediately before entering the inlet seal. This pre-heating chamber or column may be maintained at a temperature, or with a temperature gradient, whereby the articles are heated to a temperature approaching that at the entrance of the inlet seal, thereby avoiding abrupt temperature variations of the articles as they are fed in. This pre-heating chamber may be heated by water drawn from the hotter side of the outlet cooling tank, e. g. as it is circulated towards the pipe 16 for feeding to the sealing columns, or through a separate pipe system.

It will be appreciated that known sterilising machines such as hereinbefore described, comprising a heated sterilising chamber sealed by one or more liquid columns, can readily be adapted to incorporate the features of the present invention, and it is within the scope of the invention to provide attachments for known sterilising machines whereby the advantages of the invention will be introduced. Such attachments may comprise, for example, a set of pipes corresponding to pipes 13, 15, 16, 18, 19 and 20 shown in Figure 1 (the pipes corresponding to the cross-members of the T-junction of pipe 16 being fitted with, or adapted to receive, thermostat control devices, 17, also provided), a mixing chamber similar to tank 14, and a pump corresponding to pump 15. These attachments may be suitably dimensioned and shaped to fit to the appropriate sections of an existing sterilising machine, and it will be seen that by cutting suitable apertures in the walls of the machine the attachment pipes can readily be secured thereto without difficulty.

From the above description it will be seen that appropriate temperature control is exercised on the head of a liquid sealing column by injecting liquid from another source, e. g. another point in the circulatory system of the apparatus. By this means the liquid density at the top of the column is maintained at a value necessary to guard against rupture of the seal. In general, when steady conditions are reached, the injected water will be cooler than the liquid at the head of the sealing column, but under some temporary conditions (e. g. if the infed bottles reach the column at a substantially reduced temperature) the temperature of the head of the column may be reduced to such an extent that the injected water is, for the time being, warmer than the head of the column. Under these conditions the injected water will tend to heat the head of the column and will continue to do so until, under the thermostat controls provided, additional heat is supplied to the system, (e. g. at the steam heating coils), and, by conduction through the seal, re-established steady conditions with a modified heat gradient in the column.

If desired the form of the invention shown in Figures 1 and 2 herewith may be modified by inserting an additional pipe connection between the pipe 8 and the overflow tank 14, the outlet from this additional pipe into the tank 14 being controlled by a float valve operable in accordance with the liquid level in tank 14. This arrangement ensured proper operation of the apparatus when (e. g. due to a gap in the line of bottles or other articles being passed through the machine) displacement of water in cooling tank 7 is reduced and the level of water therein falls below the overflow outlet 13. (Figure 4).

In these circumstances the tank 14 would be completely drained. This difficulty is overcome by provision of an additional supply line from pipe 8 as described above. If desired this arrangement may be further modified by providing an adjustable valve in place of the float valve, allowing an adjustable amount of the supply to tank 14 to be taken continuously from pipe 8 and thereby facilitating adjustment of the water temperature in tank 14. It will be noted that these modifications allow adjustment of water flow through the cooling tank 7 without interfering with the water supply to tank 14 and from there to the sealing columns 4 and 5.

It will be seen that the invention as described above provides a sterilising machine adapted to remain stable and to operate satisfactorily under the temperature conditions described, but it must be understood that the invention is not restricted solely to the constructional details of the forms described, which may be modified in various ways to fulfill different working conditions and requirements encountered, without departing in any way from the scope of the invention.

What I claim is:

1. A method of steam sterilizing articles in a closed heated steam sterilizing zone having an inlet sealed by a water-filled U-shaped sealing zone having an inner leg in communication with said sterilizing zone and an outer leg in communication with the atmosphere, passing the articles to be sterilized serially through the outer and inner legs of the sealing zone into the steam sterilizing zone, and forcibly positively cooling a fixed length of the upper portion of the column of water in the outer leg of the sealing zone from the top thereof down to a point about one third of the depth of the column of water in the outer leg.

2. A method of steam sterilizing according to claim 1 in which the cooling of the fixed length of the column of water is effected by introducing cold water into the outer leg at the uppermost portion of the column of water in said outer leg, and discharging water from the column of water at a point about one-third of the depth of the column of water.

3. A method of steam sterilizing according to claim 1 in which the cooling of the fixed length of the column of water is effected by passing a cooling medium in heat exchange relation with said fixed length of water in the outer leg of the sealing zone.

4. A steam sterilizing machine comprising a closed heated steam sterilizing chamber, U-shaped inlet and outlet conduits each having an inner leg in communication with said chamber and an outer leg in communication with the atmosphere, columns of water in said conduits, a cooling tank containing water at lower temperature than the water in said sealing columns, means for conveying articles to be sterilized through said inlet conduit, into and through said sterilizing chamber, out therefrom through said outlet conduit, and into and through said cooling tank, a water transfer conduit providing communication between said cooling tank and the top of the sealing column of water in the outer leg of said inlet conduit, pump means in said water transfer conduit for effecting movement of water from said cooling tank to the top of the column of water in the outer leg of said inlet conduit, and means including an outlet in the outer leg at a level below the level at which cold water is delivered by said water transfer conduit to said sealing column through which outlet water escapes at substantially the same rate as said cold water is delivered to said sealing column, for maintaining a substantially constant level of water in said inlet sealing column.

5. A sterilizing machine according to claim 4 wherein the water transfer conduit communicates with, and transfers water from said cooling tank to the top of the sealing column in the outer leg of the outlet conduit, as well as to the top of the sealing column in the outer leg of the inlet conduit.

ALEXANDER HYDE WEBSTER.

References Cited in the file of this patent

UNITED STATES PATENTS

| Number | Name | Date |
|---|---|---|
| 2,154,978 | Galvin | Apr. 18, 1939 |

FOREIGN PATENTS

| Number | Country | Date |
|---|---|---|
| 377,890 | Great Britain | Aug. 14, 1932 |